Feb. 16, 1943.　　　D. J. CRAWFORD　　　2,310,939
PERISCOPE
Filed Aug. 28, 1941　　　3 Sheets-Sheet 1

Inventor
David J. Crawford
By J J Kessenich & J H Church
Attorneys

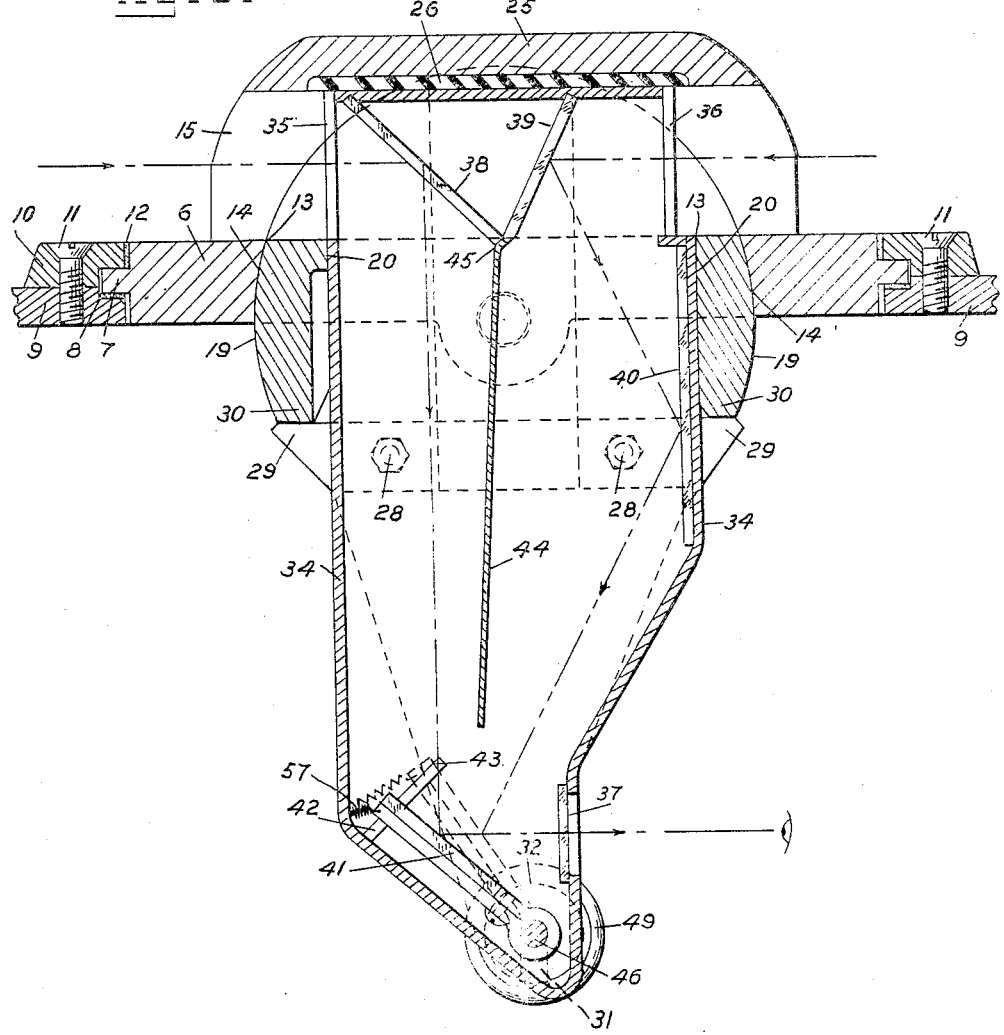

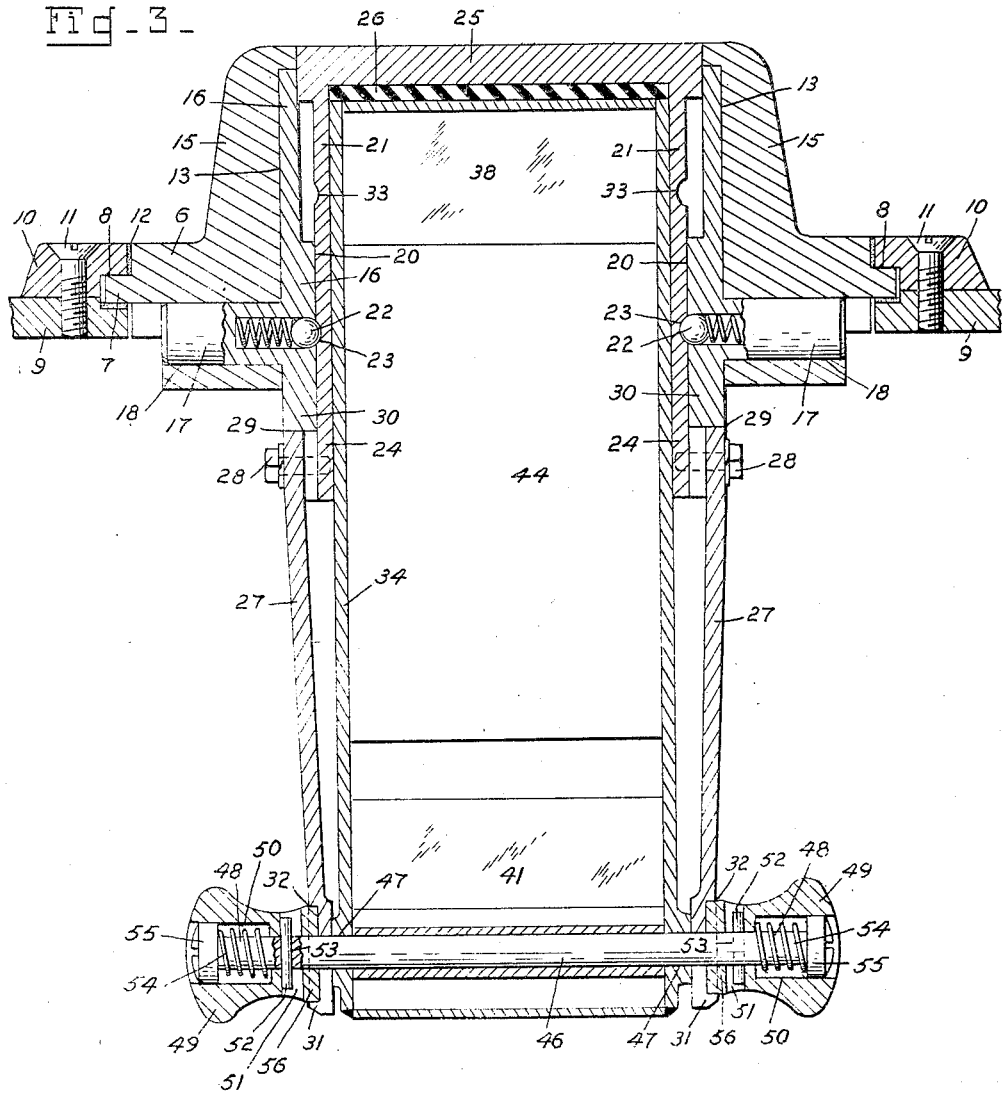

Patented Feb. 16, 1943

2,310,939

UNITED STATES PATENT OFFICE 2,310,939

PERISCOPE

David J. Crawford, United States Army, Durant, Miss.

Application August 28, 1941, Serial No. 408,643

14 Claims. (Cl. 88—68)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a periscope and more particularly to a periscope for an armored structure which permits an observer to see optionally in front or behind.

In accordance with a preferred embodiment of the invention, the device comprises a rotor journalled about a horizontal axis adjacent an observation aperture in the armor plate at the top of an armored device. The section of armor plate supporting the rotor is in turn mounted to provide traverse. A removable indirect vision device is mounted in the rotor and is provided with mirrors or prisms so arranged as to permit alternatively forward or rear vision through the observation aperture as well as affording complete safety to an observer from enemy gunfire. A swinging mirror is employed to permit selective forward or rear vision and has means to eliminate confusion in a busy observer's mind as to the direction of his observations. The traverse feature of the mounting combined with the design of the optical elements permits vision through 360° azimuth by simple movements of the device and the operator's head thereby eliminating the necessity for complete rotation of the observer or the periscope to scan the entire horizon. Thus speed of operation is increased and confusion concerning the direction of sight is reduced. Movement of the device about its horizontal axis permits elevation and provides a greater flexibility in operation.

An object of this invention is to provide an indirect observation device for an armored structure which permits an observer to view with safety the entire horizon by simple movements of his head and a few limited movements of the observation device.

Another object of the invention is to provide a periscope which will afford an option of front or rear vision from an armored device with simple automatic means for eliminating the possibility of a busy observer being confused as to the direction of his line of sight.

The specific nature of the invention as well as other objects and advantages thereof will clearly appear from a description of a preferred embodiment as shown in accompanying drawings, in which:

Fig. 2 is a sectional view on the line 2—2 of Fig. 1 showing the general arrangement of parts, Fig. 3 is a vertical longitudinal sectional view on the line 3—3 of Fig. 1.

Figure 1:
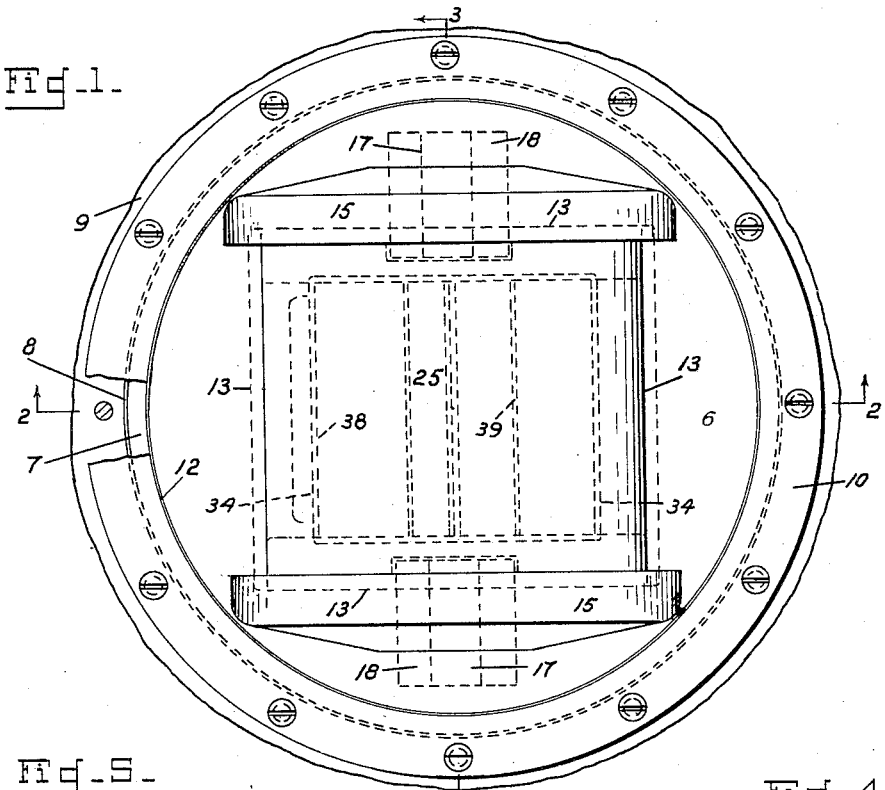
Fig. 1 is a plan view of the periscope in the top of an armored device.

Referring to the drawings by characters of reference, a circular disk 6 of armor plate is provided with an annular flange 7 which is journalled in a grooved bearing 8 in the armored top 9 of a device. A steel ring 10 is secured to the top 9 by suitable means 11 and has its inner periphery conditioned to form the grooved bearing 8 with the top 9. Packing rings 12 of suitable material are preferably employed to make a weather-tight joint at the bearing. A rectangular shaped opening 13 appears in the disk 6 and is provided with a pair of arcuate walls 14 at the front and rear ends of the opening, see Figs. 1 and 2. Integral with the disk along two opposite sides of the opening 13 are a pair of vertical plates 15 which are employed for a purpose which will be mentioned later.

A rotor 16 having a pair of trunnions 17 is journalled in hollow cylindrical bearings 18 in the disk 6. Rotor 16 occupies the opening 13 in the disk, see Figs. 2 and 3. The rotor has a pair of curved walls 19 which conform to the arcuate walls 14 in the disk 6 in such a manner as to permit relative movement therebetween. In the rotor 16 is a rectangular aperture 20 which receives a demountable housing 21 in a sliding fit. Spring pressed detents 22 in the trunnions 17 of the rotor 16 engage recesses 23 in the housing 21 and retain it in the aperture 20 of the rotor.

Figure 5:
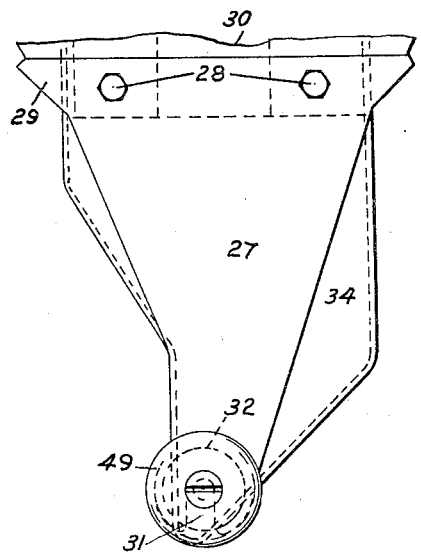
Fig. 5 is a side elevational view of the lower portion of the periscope mounting.

Housing 21 is a frame-like metal structure having a pair of side walls 24 and an armored top 25. The under surface of the armored top is lined with a resilient shock absorbing material 26. The armored top 25 is preferably longer than the rectangular shaped opening 13. A pair of depending legs 27 are attached to the side walls 24 by fasteners 28 and form shoulders 29 since the legs are on the outside, see Figs. 3 and 5. These shoulders engage the bottom portions 30 of the rotor 16 whereby the upward movement of the housing 21 in the aperture 20 of the rotor is limited, see Figs. 2 and 3. The shoulders 29 extend beyond the curved walls 19 of the rotor 16 for a purpose which will be explained later, see Fig. 2. The lower end of each leg 27 has a notch 31 and a circular recess 32 in the outer side of the leg, see Fig. 5. The two act to form a latch element in a manner which will be described in another part of the specification. Above the recesses 23 in the housing 21 are a second pair of recesses 33 which permit the housing to be indexed to a second position and retained thereat by the detents 22, see Fig. 3.

Manufacturing the rotor 16 and the housing 21 in a single integral rotatable member has been contemplated.

A periscope body 34 encloses the optical elements and is adapted for insertion in the housing 21. The body is preferably a metal box with a pair of rectangular windows 35 and 36 at the top on the front and back sides respectively. The lower rear side is provided with an observation window 37 through which the operator may sight. Adjacent the front window 35 is a fixed 45° mirror 38 for reflecting light rays into the body portion of the periscope. In back of the rear window 36 is mounted a mirror 39 which is disposed at an angle of approximately 60° for deflecting rays toward the bottom of the periscope. A third mirror 40 is secured to the rear vertical wall of the periscope body 34 and is aligned to receive rays of light from the mirror 39 and deflect them toward the bottom of the box. This mirror is shown fixed in a vertical position to the wall of the periscope body but may be made angularly adjustable thereon if desired. Optical elements 35, 36, 38 and 39 are preferably constructed from a frangible plastic so that they will be broken into small pieces when struck by a projectile.

At the base of the periscope is a swinging mirror 41 which is adapted for movement to either of two positions. In the position shown in full lines in Fig. 2 the mirror rests against a stop 42 which maintains the mirror at a 45° angle with the horizontal. Here it is positioned to deflect light rays entering the front window 35 and reflected from the 45° mirror 38 back through the observation window 37 to the eyes of the observer. This insures front vision. When the swinging mirror 41 is rotated to the position shown by the dotted lines in Fig. 2, it strikes a stop 43 which is set to halt the mirror at an angle of about 60°. Light rays received from the mirrors 38 and 40 by way of the rear window 36 are reflected through the observation window 37, thus providing rear vision. A light shield 44 is secured near the apex 45 of the upper mirrors and depends in the periscope body 34 thereby dividing it into two compartments, see Fig. 2. This shield together with the arrangement of the mirrors insures that during front view operation, only light from the front widow 35 of the periscope will reach the operator's eyes. Likewise during rear view operation, only light from in back of the periscope will be transmitted to the observer's eyes, thereby promoting clarity of vision.

The oscillatable mirror 41 is secured to a shaft 46 which is journalled in a pair of bearings 47 on side walls at the bottom of the periscope body 34, see Fig. 3. The ends 48 of the shaft 46 extend beyond the periscope body and engage a pair of adjustment knobs 49. Each knob has an axial bore 50 and an intersecting diametrical bore 51. The ends 48 of the shaft are received in the axial bores 50 and are secured to the knobs 49 by elongated pins 52 which are press fitted in transverse bores 53 in the shaft and extend into the diametrical bores 51. Coil springs 54 encircle a portion of the ends 48 of shaft 46 and rest in the bores 50. Headed cap screws 55 are employed to retain these springs on the shaft and in the bores. The diametrical bores 51 have larger diameters than the pins 52 thereby permitting relative movement between the knobs 49 and the shaft 46. The knobs 49 are provided with bases 56 which are adapted to be seated in the circular recesses 32 when the periscope body 34 is inserted in its housing 21 as shown in Fig. 3. The springs 54 are in compression so as to thrust the bases 56 of the knobs into the recesses 32, thereby normally retaining the periscope in that position.

The periscope body 34 may be removed from housing 27 by pulling outwardly and downwardly on the knobs 49. Pulling outwardly compresses springs 54 and displaces the knobs relative to the fixed shaft 46 thereby removing the bases from the retaining recesses 32 whereby a downward pull will permit the periscope to be dislodged from its housing. Upon insertion of a periscope in the housing, the top strikes the shock absorbing material 26 thereby preventing breakage of the optical elements and the knob is automatically latched in recess 32 by springs 54.

The knobs 49 and the shaft 46 permit adjustment of the mirror 41 to its two operative positions. Mirror 41 is normally retained in the 45° position against stop 42 by a pair of springs 57 which are secured to the top corners of the mirror and to the periscope body 34. Turning of the knobs in the proper direction brings the mirror against the upper stop 43. Upon release of the knobs, the mirror 41 is pulled back against the lower stop 42 by the action of the springs 57. Thus the mirror 41 always provides front vision and unless some positive action is taken, the observer cannot have rear vision. This is an important feature since it eliminates mistakes by a busy observer engaged in combat operations as to the direction of his field of view.

The operation of the device is as follows: With the periscope in its housing as shown in Figs. 2 and 3, the observer takes his position so that his eyes are on a level with the observation window 37. Selective front or rear vision is provided depending upon the position of the mirror 41. The observer has a front field of vision which includes about 30° to 60° of the horizon depending upon the size and spacing of the optical elements in the periscope. A similar field to the rear is provided when the lower mirror is tilted upward. By grasping the knobs 49 and rotating or indexing the periscope horizontally in its grooved bearing 8 through successive angular increments, the entire front field of vision may be observed. Where the optical field of the periscope is 30°, six simple indexing operations will cover the front horizon. By employing the tilting mirror 41 during these operations, the entire 360° of horizon may be scanned. Thus the operator can observe his surroundings by simple movements of his head and the periscope. The necessity for swinging about in his seat or rotating the sighting device 180°, as with some devices, is unnecessary when it is desired to discern the rear horizon. Thus the speed of operation is increased and the opportunity to mistake the direction of the line of sight is materially reduced.

About 20° of elevation both front and rear may be obtained by swinging the rotor 16 on its trunnions 17. The degree of elevation is limited since the shoulders 29 strike the under side of the disk 6, see Fig. 2.

Figure 4:
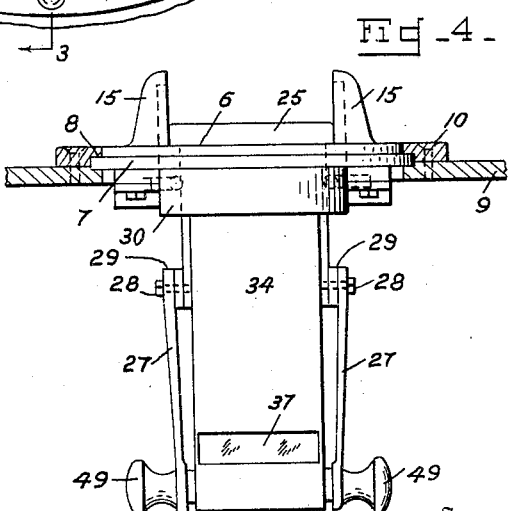
Fig. 4 is a view in rear elevation of the vision device lowered in its mounting and ready for removal therefrom.

The vertical plates 15 on the sides of the disk 6 protect the sides of the exposed portion of the periscope from enemy gunfire. A projectile from the front or the rear which strikes the exposed brittle optical elements shatters them and renders the periscope useless. A downward pull on knobs 49 lowers the housing 21 by disengaging the spring pressed detents 22 from the recesses 23. The housing is lowered until the detents 22 snap into the upper recesses 33. The opening into the armored device is now sealed by the armored top 25 as shown in Fig. 4. The periscope may then be withdrawn from the housing by pulling outwardly and downwardly on the knobs 49 as previously described. A replacement periscope may be thrust into the housing where it is automatically latched therein. An additional vertical thrust forces the housing to the position shown in Figs. 2 and 3 whereupon the device is again ready for observation purposes.

I claim:

1. In a periscope, a body having a front and a rear opening at one end and an observation aperture at the other end, a fixed mirror in said body adjacent the front opening, a second fixed mirror in said body adjacent the rear opening, said mirrors adapted to receive images from opposite directions and reflect them into said body, a third, image-erecting mirror in said body arranged to receive reflections from said second mirror and transmit them toward said other end of said body, and a fourth mirror pivotally mounted in said last mentioned end of said body for selective movement into two positions of adjustment to receive images from said first and third mirrors alternatively and reflect them through said observation aperture.

2. In a periscope, a body having a front and a rear opening at one end and an observation aperture at the other end, a fixed mirror in said body adjacent the front opening, a second fixed mirror in said body adjacent the rear opening, said mirrors adapted to receive images from opposite directions and reflect them into said body, a third, image-erecting mirror in said body arranged to receive reflections from said second mirror and transmit them toward the other end of said body, a fourth mirror pivotally mounted in said last mentioned end of said body for selective movement into two positions of adjustment to receive images from said first and third mirrors alternatively and reflect them through said observation aperture, and a light shield in said body to prevent images reflected from said mirrors from interfering with each other at the observation aperture.

3. In a periscope, a body having a front and a rear opening at one end and an observation aperture at the other end, a fixed mirror in said body adjacent the front opening, a second fixed mirror in said body adjacent the rear opening, said mirrors adapted to receive images from opposite directions and reflect them into said body, a third, image-erecting mirror in said body arranged to receive reflections from said second mirror and transmit them toward said other end of said body, a fourth mirror pivotally mounted in said last mentioned end of said body for selective movement into two positions of adjustment to receive images from said first and third mirrors alternatively and reflect them through said observation aperture, and means normally maintaining said fourth mirror in a position of adjustment whereby images from a front direction are reflected through said observation aperture.

4. In a periscope, a body having a front and a rear opening at one end and an observation aperture at the other end, a fixed mirror in said body adjacent the front opening, a second fixed mirror in said body adjacent the rear opening, said mirrors adapted to receive images from opposite directions and reflect them into said body, a third, image-erecting mirror in said body arranged to receive reflections from said second mirror and transmit them toward the other end of said body, a fourth mirror pivotally mounted in said last mentioned end of said body for selective movement into two positions of adjustment to receive images from said first and third mirrors alternatively and reflect them through said observation aperture, means normally retaining said fourth mirror in a position of adjustment whereby images from a front direction are reflected through said observation aperture, and a light shield in said body to prevent images reflected from said first and second mirrors from interfering with each other at the observation aperture.

5. In a periscope, a body having a front and a rear opening at one end and an observation aperture at the other end, a fixed mirror in said body adjacent the front opening, a second fixed mirror in said body adjacent the rear opening, said mirrors adapted to receive images from opposite directions and reflect them into said body, a third, image-erecting mirror in said body arranged to receive reflections from said second mirror and transmit them toward said other end of said body, a fourth mirror pivotally mounted in said last mentioned end of said body for selective movement into two positions of adjustment to receive images from said first and third mirrors alternatively and reflect them through said observation aperture, and resilient means normally retaining said fourth mirror in a position of adjustment whereby images from a front direction are reflected through said observation aperture.

6. In a periscope, a body having a front and a rear opening at one end and an observation aperture at the other end, a fixed mirror in said body adjacent the front opening, a second fixed mirror in said body adjacent the rear opening, said mirrors adapted to receive images from opposite directions and reflect them into said body, a third, image-erecting mirror in said body arranged to receive reflections from said second mirror and transmit them toward said other end of said body, a fourth mirror pivotally mounted in said last mentioned end of said body for selective movement into two positions of adjustment to receive images from said first and third mirrors alternatively and reflect them through said observation aperture, and a return spring between said fourth mirror and said body normally retaining said mirror in a position of adjustment whereby images from a front direction are reflected through said observation aperture.

7. In a device for indirect observation from an armored structure, a disk having an aperture therein rotatably mounted in the armor of said structure, a hollow housing swingably supported in the aperture in said disk about an axis perpendicular to the axis of rotation of said disk, a demountable periscope body in said housing, said body having a front and a rear opening at one end and an observation aperture at the other end, said front and rear openings in said body normally protruding beyond the housing and the armor of said structure, a mirror in said body adjacent the front opening, a second mirror in said body adjacent the rear opening, said mirrors adapted to receive images from opposite directions and reflect them into said body, a third mirror in said body arranged to receive reflections from said second mirror and transmit them toward the other end of said body, and a fourth mirror pivotally mounted in said last mentioned end of said body for selective movement into two positions of adjustment to receive images from said first and third mirrors alternatively and reflect them through said observation aperture.

8. In a device for indirect observation from an armored structure, a disk having an aperture therein rotatably mounted in the armor of said structure, a hollow housing swingably supported in the aperture in said disk about an axis perpendicular to the axis of rotation of said disk, a demountable periscope body in said housing, said body having a front and a rear opening at one end and an observation aperture at the other end, said front and rear openings in said body normally protruding beyond the housing and the armor of said structure, a mirror in said body adjacent the front opening, a second mirror in said body adjacent the rear opening, said mirrors adapted to receive images from opposite directions and reflect them into said body, a third mirror in said body arranged to receive reflections from said second mirror and transmit them toward the other end of said body, a fourth mirror pivotally mounted in said last mentioned end of said body for selective movement into two positions of adjustment to receive images from said first and third mirrors alternatively and reflect them through said observation aperture, and a light shield in said body to prevent images reflected from said first and second mirrors from interfering with each other at the observation aperture.

9. In a device for indirect observation from an armored structure, a disk having an aperture therein rotatably mounted in the armor of said structure, a hollow housing swingably supported in the aperture in said disk about an axis perpendicular to the axis of rotation of said disk, a demountable periscope body in said housing, said body having a front and a rear opening at one end and an observation aperture at the other end, said front and rear openings in said body normally protruding beyond the housing and the armor of said structure, a mirror in said body adjacent the front opening, a second mirror in said body adjacent the rear opening, said mirrors adapted to receive images from opposite directions and reflect them into said body, a third mirror in said body arranged to receive reflections from said second mirror and transmit them toward the other end of said body, a fourth mirror pivotally mounted in said last mentioned end of said body for selective movement into two positions of adjustment to receive images from said first and third mirrors alternatively and reflect them through said observation aperture, means normally maintaining said fourth mirror in a position of adjustment whereby images from a front direction are reflected through said observation aperture, and a light shield in said body to prevent images reflected from said first and second mirrors from interfering with each other at the observation aperture.

10. In a device for indirect observation from an armored structure, a disk having an aperture therein rotatably mounted in the armor of said structure, a pair of armored walls on said disk on two sides of said aperture, a housing swingably supported in the aperture in said disk about an axis perpendicular to the axis of rotation of said disk, an armored top and depending sides on said housing, said sides adapted to slide between the armored walls on said disk, said top having ends extending beyond the ends of said aperture, said housing arranged to be reciprocated selectively in said aperture between an upper open position and a lower closed position whereby said aperture is respectively exposed at the ends or sealed by said top, a demountable periscope body in said housing, said body having a front and a rear opening in one end and an observation aperture at the other end, a mirror in said body adjacent the front opening, a second mirror in said body adjacent the rear opening, said mirrors adapted to receive images from opposite directions outside of said armored structure and reflect them into said body, a third mirror in said body arranged to receive reflections from said second mirror and transmit them toward the other end of said body, a fourth mirror pivotally mounted in said last mentioned end of said body for selective movement into two positions of adjustment to receive images from said first and third mirrors alternatively and reflect them through said observation aperture, means normally retaining said fourth mirror in a position of adjustment whereby images from a front direction are reflected through said observation aperture, and a light shield in said body to prevent images reflected from said first and second mirrors from interfering with each other at the observation aperture.

11. In a periscope, a pair of fixed mirrors adapted to receive images from opposite directions and reflect them in substantially the same direction, and a mirror arranged for selective movement into two positions of adjustment to receive images reflected from said fixed mirrors whereby alternative front and rear vision is provided with the images appearing in their erect relationship.

12. In a periscope, a pair of fixed mirrors adapted to receive images from opposite directions and reflect them in substantially the same direction, and selective means arranged to receive images reflected from said mirrors whereby alternative front and rear vision is provided with the images appearing in their erect relationship.

13. In a periscope, a pair of fixed mirrors adapted to receive images from opposite directions and reflect them in substantially the same direction, an image erecting mirror angularly disposed in the optical path of one of said mirrors, and an adjustable optical means coacting with said mirrors whereby an observer has alternative front and rear vision.

14. In a periscope, a pair of oppositely disposed fixed mirrors, an image-erecting mirror in the optical path of one of said mirrors and a single adjustable optical means coacting with said mirrors whereby an observer has alternative front and rear vision.

DAVID J. CRAWFORD.